March 10, 1964 D. B. BERLIEN ETAL 3,124,624
PROCESS FOR PRODUCING PRILLED UREA OF LOW BIURET CONTENT
Filed March 15, 1962
FIG. 1
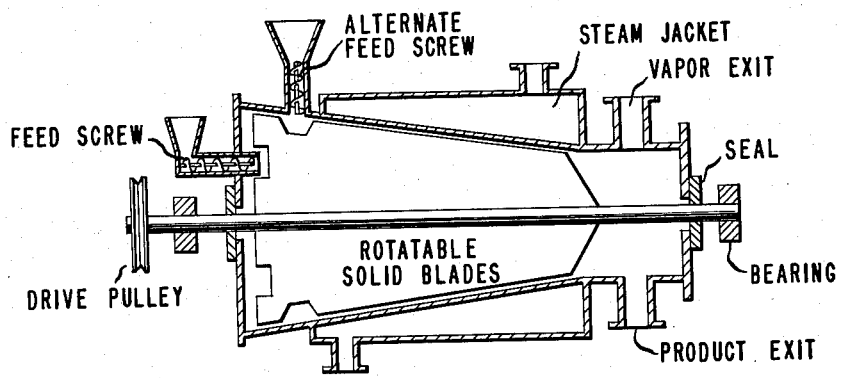
FIG. 2
FIG. 3
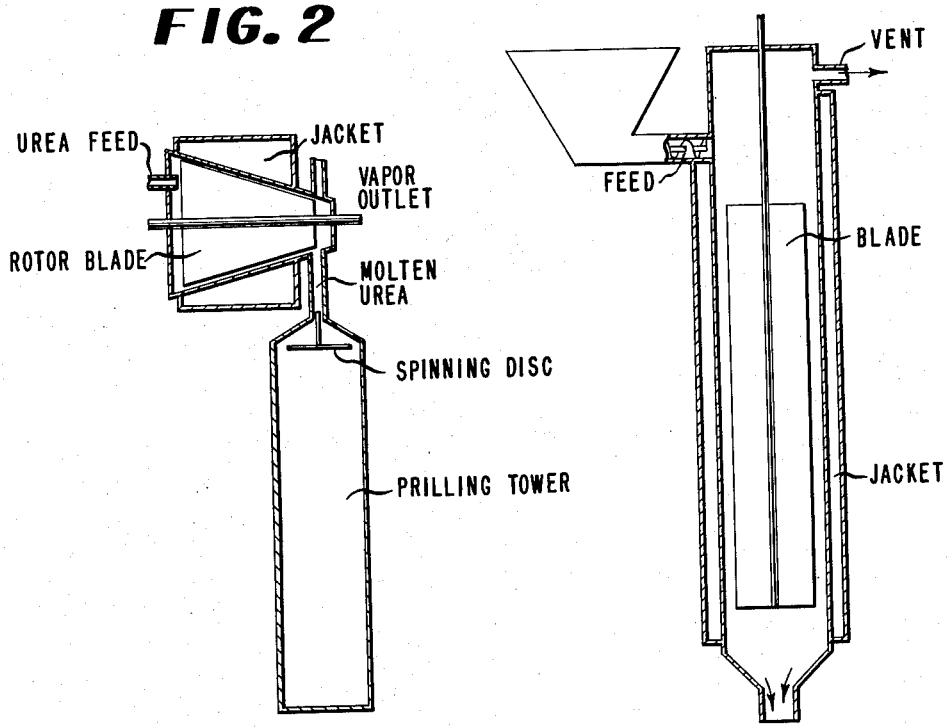
INVENTORS
DOYNE B. BERLIEN
ALBERT H. MUMMA
BY
ATTORNEY

United States Patent Office 3,124,624
Patented Mar. 10, 1964

3,124,624
PROCESS FOR PRODUCING PRILLED UREA
OF LOW BIURET CONTENT
Doyne B. Berlien and Albert H. Mumma, Charleston, W. Va., assignors to E. I. du Pont de Nemours and Company, Wilmington, Del., a corporation of Delaware
Filed Mar. 15, 1962, Ser. No. 179,905
1 Claim. (Cl. 264—13)

This invention relates to the preparation of prilled urea and more particularly to apparatus and processes for converting urea crystal to prilled urea by direct melting of crystal of low biuret content.

In the drawing

FIGURE 1 is a semi-diagrammatic representation of a preferred melting apparatus useful in this invention;

FIGURE 2 illustrates a preferred apparatus of this invention; and

FIGURE 3 shows an alternative useful melting apparatus.

Prilled urea is customarily produced by heating the water-urea product produced by reaction of ammonia and carbon dioxide to remove the water and to obtain molten urea and the molten urea is then prilled by spraying into cool gases. The urea thus prilled is of comparatively high biuret content, running ordinarily about 0.7% to 2.5% by weight.

Urea of higher purity and low biuret content is obtained by crystallizing the urea from water. It would be highly desirable to be able to melt the pure crystallized urea of low biuret content and then form prills from the melt without raising the biuret content. However it is known that the formation of biuret in urea is promoted by heat.

In one prior way of solving this problem, water is added to crystal urea of low biuret content purity to make a solution or slurry, and this solution or slurry is then heated to simulaneously remove the water and produce molten urea which can be prilled to make a product of low biuret content. This process is described and claimed in Beecher et al. U.S. patent application serial No. 5,411, filed January 29, 1960, and allow August 8, 1961, now Patent No. 3,025,571.

According to the present invention, prills of urea are produced in a process wherein solid urea is formed by centrifugal force into an annular film having a maximum thickness of 0.05 inch, and preferably less than 0.03 inch, and the annular film is moved in surface contact with a heat transfer surface through a heating zone in less than about 12 seconds while maintaining the average film temperature from 132° to 150° C. The urea melted in this fashion is then prilled in conventional manner as by spraying as droplets into a conventional prilling tower.

The urea starting material employed according to the invention will contain from about 0.05 to 0.50% of biuret based upon the weight of the urea. It most often will be in crystal form but can be in the form of a powder, briquette, aggregate, or the like.

The starting urea will be substantially all solid, i.e. there is substantially no urea present dissolved in a liquid phase. This does not preclude the use of wet or moist urea such as might come from a de-watering step in a centrifuge or similar apparatus. Completely anhydrous urea can of course be used.

It has been found surprisingly that the process of this invention results in prilled urea of extremely low biuret content.

As far as we are aware, this is the first time anyone has attempted to melt urea crystals without dissolving the urea to produce low biuret product by a process that can be carried out in commercially available liquid concentration apparatus.

Suitable apparatus are shown in FIGURES 1 and 3. As can be seen in the self-explanatory drawing, the feed of urea is into a cylindrical vessel suitably jacketed for temperature control. Rotating blades in one embodiment serve to form the urea into a extremely thin film on the vessel interior surface where the urea is melted.

Held in film form by centrifugal force, the urea film is moved through the apparatus by one or more of conventional means. These include rate of crystal feed, gravitational force, vacuum at discharge, etc. Rotor blade clearance and speed of rotation will also effect flow rate in customary manner.

In a novel apparatus shown in a preferred embodiment in FIGURE 2 particularly advantageous results are obtainable. The apparatus comprises a jacketed rotary evaporator having a feed inlet, a vapor outlet, a rotatable blade, a product outlet at the opposite end from the inlet, and urea prilling means in direct combination with the evaporator with the outlet of the evaporator feeding directly into the prilling means inlet.

This apparatus combination when so arranged enables the production of urea prill of exceptionally low biuret content and far better than could have been anticipated by tests using any portion of the apparatus alone.

One outstanding apparatus useful as the urea melting means is a Kontro evaporator commercially available from The Kontro Company, Inc. The structure is schematically shown in FIGURE 1.

In one example of the process of this invention using apparatus of the type shown in FIGURE 1, crystal urea having an analyzed biuret content of 0.05 weight percent is introduced into the evaporator through the feed screw at a rate of 35 pounds per hour. Rotation of the blade with a clearance of $\frac{1}{32}$ inch from the vessel wall forms the urea by centrifugal force into a film of average thickness of about 0.025 inch. Average film temperature is about 135°–136° C. and the molten urea leaves the exit after an average holdup time of only about 9 seconds. Biuret buildup is only about 0.05 weight percent based on the urea. The melt is fed to a prilling tower where excellent low-biuret prills are formed.

In a repeat of the preceding example with the urea feed at 54 pounds per hour biuret buildup is only 0.20 weight percent. A similar run using apparatus of the type of FIGURE 3 has obtained biuret buildup of only 0.13 weight percent. In contrast commercially available prilled urea has biuret levels ordinarily as high as 1 to 3% by weight, depending upon the production methods used.

The invention claimed is:

In a process for producing prilled urea of low biuret content, the steps comprising taking solid urea which is substantially all in solid crystalline form and of low biuret content and forming said solid crystalline urea by centrifugal force into an annular film having a maximum thickness of 0.05 inch, moving the annular film in surface contact with a heat transfer surface for up to 12 seconds while maintaining an average film temperature of 132° to 150° C. to melt the urea, and then prilling the molten urea.

References Cited in the file of this patent

UNITED STATES PATENTS

| | | |
|---|---|---|
| 1,420,642 | Mabee | June 27, 1922 |
| 2,927,634 | Gudheim | Mar. 8, 1960 |
| 3,025,571 | Beecher et al. | Mar. 20, 1962 |
| 3,048,887 | Weiland | Aug. 14, 1962 |